United States Patent [19]
Pauze et al.

[11] 4,247,429
[45] Jan. 27, 1981

[54] COATING COMPOSITIONS

[75] Inventors: Denis R. Pauze; Richard J. Jablonski, both of Scotia, N.Y.

[73] Assignee: General Electric Company, Schnectady, N.Y.

[21] Appl. No.: 923,727

[22] Filed: Jul. 11, 1978

Related U.S. Application Data

[63] Continuation of Ser. No. 538,078, Jan. 2, 1975, abandoned.

[51] Int. Cl.$^3$ .................. C08L 67/00; C08L 75/00; C08L 77/00
[52] U.S. Cl. .................. 260/29.2 TN; 260/29.2 N; 260/29.2 E; 525/424; 525/43 5; 525/437; 525/440
[58] Field of Search .................. 260/29.2 N, 29.2 NT, 260/29.2 E; 528/273, 289; 525/424, 435, 437, 440

[56] References Cited

U.S. PATENT DOCUMENTS

| 3,737,478 | 6/1973 | Boldebuck | 260/29.2 N |
| 3,856,754 | 12/1974 | Habermeier et al. | 528/289 |
| 3,869,428 | 3/1975 | Mosimann et al. | 528/289 |

Primary Examiner—J. Ziegler
Attorney, Agent, or Firm—Morgan, Finnegan, Pine, Foley & Lee

[57] ABSTRACT

The invention relates to polymeric coating compositions which are at least partially soluble in water.

Polyesterimides, polyesteramideimides, polyesterimidehydantoins and polyesterimide urethanes are prepared which have enhanced solubility in water. The reactants which form the various polymers are reacted to essentially a zero acid number with essentially no free carboxyl groups or those which are not part of the formed imide moiety or linkages. At least some of the imide rings are then cleaved or split with amine material to enhance solubility in water. The compositions are particularly useful as electrical insulating coatings or wire enamels and can also be used in preparing laminates and composites and for general coating purposes.

6 Claims, No Drawings

COATING COMPOSITIONS

This is a continuation of application Ser. No. 538,078 filed Jan. 2, 1975, now abandoned.

This invention relates to polymeric coating compositions. More particularly, it relates to such coating compositions which have enhanced solubility in water.

Resinous coating compositions in the form of varnishes and enamels in which for ease of application the polymer is dissolved in compatible solvents are well known. Among the more useful coatings are those in which the polymer contains imide ring structure. Such resinous compositions include polyesterimides, polyesteramides, polyesteramideimides, polyesterimidehydantoins, and polyesterimide urethanes, among others. Normally, the solvents used for such materials are organic and include such materials as cresols or cresylic acid, phenol, xylene, N-methylpyrrolidone, dimethylformamide, dimethyl sulfoxide, dimethylacetamide, and the like, which, when driven off from the curing coating composition tend to pollute the atmosphere. Such solvents generally are also toxic, flammable, and some cause chemical burns. It would be advantageous from the point of view of complying with evermore strict pollution restrictions, as well as from the point of view of safety, to provide coating compositions of the above types which are readily soluble in water, and it is a primary object of the present invention to provide such coating materials.

Briefly, there are provided, according to the present invention, resinous compositions having a structure having imide rings which have enhanced solubility in water. This is accomplished by reacting the reactants making up the particular polymer variety to essentially a zero acid number and then to open the imide ring with amine, preferably tertiary amine, to give compositions of superior water solubility.

The basic polyester compositions which can be modified to prepare the present imide containing materials are widely described in the literature and in U.S. Pat. Nos. such as 2,936,296; 3,249,578; 3,297,785; and 3,312,645, among others, the teachings of such patents being incorporated herein insofar as they are pertinent to the present teaching.

In the preparation of the polyester compositions, dibasic, tribasic or tetrabasic or polybasic acid material and polyhydric alcohol having at least three hydroxyl groups and diol are combined in varying proportions. For example, the equivalent ratio of diol to polyhydric alcohol typically ranges from about 1 to 0.5 up to about 1 to 1.50, and preferably this ratio is 1 to 0.75. The equivalent proportion of the acid to the alcohol ranges from about 1 to 0.75 up to about 1 to 1.75, and preferably is 1 to 1.05.

In preparing the polyesterimide variation of the present invention, up to about 50 equivalent percent of the total acid constituent of the polyester can be replaced by other carboxylic acid material containing imide groups such as those produced by the reaction of tricarboxylic acid material with polyamine in a 2 to 1 equivalent proportion.

Polyesterimidehydantoin materials or polyesterimides containing hydantoin groups can be prepared by substituting for up to about 95 equivalent percent of the hydroxyl group containing material, hydantoin group containing material having two or more hydroxyl groups. Likewise, hydantoin group containing material having two or more acid or carboxylic groups can be substituted for part of the dibasic acid material.

In preparing the polyesterimide or polyesteramideimide variations of the present invention, typically up to about 50 equivalent percent of the alcohol constituent can be replaced by polyamine to form imide and/or amideimide group containing materials.

In preparing polyesterimide urethanes, up to about 40 equivalent percent of the acid can be replaced by polyisocyanate.

It will be realized that the above types of polymers can be admixed or they can be combined in various proportions as desired by utilizing the desired proportions of the various group containing materials.

The dibasic acids useful in the present connection include oxalic, maleic, succinic, glutaric, adipic, pimelic, suberic, azelaic, sebacic and dodecanedioic acids as well as unsaturated materials including maleic and fumaric materials, among others. Such acids can be expressed by the formula

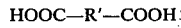

where R' is a divalent saturated or unsaturated aliphatic group or one containing a carbon-to-carbon double bond and having from about one to forty carbon atoms, while the anhydrides can be expressed by

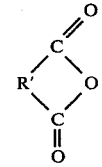

Also included are aromatic anhydrides or diacids or triacids or tetracids which are well known to those skilled in the art including, among others, isophthalic acid, terephthalic acid, mixtures thereof and their lower dialkyl esters, pyromellitic dianhydrides, benzophenonetetracarboxylic dianhydride and tetracarboxylicbutane dianhydride and trimesic acid as well as heterocyclic dibasic acids such as di(2-carboxyethyl)dimethylhydantoin. The unsaturated materials are also useful for end-capping or as terminal end groups as well as in the preparation of the intermediate material. The aliphatic and aromatic polybasic acid can be used above or in admixture in the preparation of the original mix of specific acid number and then used interchangeably or together to adjust this number where indicated. Alternatively, of course, all ingredients can be added in the original mix to give a final desired acid number.

Among the polyhydric alcohols having three or more hydroxyl groups are glycerine, 1,1,1-trimethylolethane, sorbitol, mannitol, diglycerol, trimethylolpropane, pentaerythritol, tris(2-hydroxyethyl)isocyanurate, etc.

It will be realized also that in lieu of preparing the polyester variants by adding the modifying ingredients to the original reaction mixture, such variants can be prepared by first preparing the polyester itself and then introducing in well known manner imide or other desired group containing materials as is shown, for example, in the case of polyesterimides in U.S. Pat. No. 3,697,471.

Any of a number of diols can be used including ethylene glycol, neopentyl glycol, butane diol, pentane diol, and the like. Others will occur to those skilled in the art.

Among the tricarboxylic acid materials which are useful are trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-terylene tricarboxylic anhydride; 3,4-dicarboxyphenyl 3-carboxyphenyl ether anhydride, ethylene tricarboxylic anhydride; 1,2,5-naphthalene tricarboxylic anhydride, etc. The tricarboxylic acid materials can be characterized by the following formula:

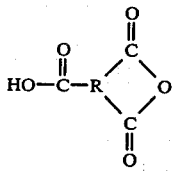

where R is a trivalent organic radical.

The polyamines useful in connection with the present invention may also be expressed by the formula

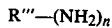

where R''' is a member selected from the class consisting of organic radicals of at least two carbon atoms (both halogenated and unhalogenated) including but not limited to, e.g., hydrocarbon radicals of up to 40 carbon atoms, and groups consisting of at least two aryl residues attached to each other through the medium of a member selected from the class consisting of an alkylene radical of from 1 to 10 carbon atoms, —S—, —SO$_2$—,

and —O—, etc., and n is at least 2.

Among the specific amines useful for the present invention, either alone or in admixture, are the following:

p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylene diamine
polymethylene polyaniline Among the polyisocyanates useful in connection with the invention are those having two or more isocyanate groups, whether blocked or unblocked. Blocked isocyanates using as the blocking constituent phenols or alcohols, among others, can be used and in general provide a higher molecular weight final material which is advantageous in coating compositions. On the other hand, the unblocked isocyanates provide more flexible final materials. At any rate, the blocking material must be evaporated off as much as possible and there is no advantage from the purely reaction point of view as using the blocked material except as stated above. Typical of the blocked polyisocyanates is Mondur S wherein mixtures of 2,4- and 2,6-tolylene diisocyanate are reacted with trimethylol propane and blocked by esterification with phenol in the proportions of three moles of isocyanate, one mole of trimethylol propane, and three moles of phenol. In Mondur SH the isocyanate groups of mixed 2,4- and 2,6-tolylene diisocyanate are blocked by esterification with cresol. Among specific polyisocyanates which are useful alone or in admixture are the following:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate 4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate
3,3'-dimethoxy-4,4'-biphenylenediisocyanate
3,3'-diethoxy-4,4-biphenylenediisocyanate
1,1-bis(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4"-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylenepolyphenylene isocyanate The organic solvents where such are used in the present invention are well known to those skilled in the art and include N-methylpyrrolidone, dimethylformamide, dimethyl sulfoxide, dimethylacetamide, and isopropanol. Where such solvents are used in conjunction with water in the present invention, they are utilized to facilitate the runnability of the final coating composition, that is, to avoid such defects in the finished coatings as blisters and streaking or alternate light and dark spots. While the above solvents can be used alone, it has been found in some cases advantageous in solubilizing the composition in water to add up to about 10 percent by weight of other solvent such as alcohols such as butanol, ethylene glycol, propylene glycol, etc., the cellosolves or carbitols, including but not limited to butyl cellosolve, ethyl cellosolve or other ester materials such as butyl acetate, ethyl acetate, and the like.

Generally, in preparing the present materials the alcoholic ingredients and acid or substituted acidic ingredients are mixed together and heated at a temperature of about 220° C. to an acid number of essentially zero so that there are essentially no free carboxyl groups that are not part of the imide linkages or groupings. Generally, at this point the butyl cellosolve, butanol or other similar material is added where such solution promotors are indicated. There is then added to the solution an amine group containing material which cleaves at least some of the imide rings providing for enhanced water solubility. Preferably, from thirty to about one hundred percent of the imide groups are so reacted. Among the amine group containing materials useful in this respect are primary and secondary amines. Preferred are tertiary amines which are well known to those skilled in the art and include, among others, dimethylethanolamine, triethanolamine, phenylmethylethanolamine, butyldiethanolamine, phenyldiethanolamine, phenylethylethanolamine, methyldiethanolamine, and triethylamine. Also useful is ammonia or ammonium hydroxide.

After the amine group containing material has been added and reacted, the remainder of any water desired to obtain the required solids content is added.

The following examples illustrate the practice of the present invention, it being understood that they are not to be taken as limiting in any way. All parts unless otherwise specified are by weight.

EXAMPLE 1

A reaction vessel equipped with stirrer, condenser, Dean Stark trap and thermometer was charged with 142 parts trimethylol propane, 266 parts neopentyl glycol, 158 parts methylene dianiline, 257 parts trimellitic anhydride, 225 parts N-methylpyrrolidone, 335 parts of 85 percent isophthalic acid-15 percent terephthalic acid by weight, 25 parts tetraisopropyl titanate (TPT) and 105 parts adipic acid. The contents were heated to a maximum of 225° C. and held until the acid number was essentially zero. The contents were cut with 250 parts of butanol and then 142 parts of dimethylethanolamine in 200 parts of water were added. The amount of amine added was slightly over that necessary to open up or cleave all imide rings. Finally, 1800 parts of water were added to produce a clear, water-soluble polyesteramideimide enamel having a solids content of 28.7 percent by weight and a Gardner-Holt viscosity at 25° C. of Z-2. When applied to 18 AWG copper wire at a speed of 55 ft/min. to a build of up to 2.9 to 3.0 mils and cured at a temperature from about 300° C. to 475° C., the flexibility at 25 percent stretch was 1X. There was only one continuity break per 100 feet. Then 170° C. dissipation factor was 3.7, the 200 grams cut-through was 226° C., the 150° C. heat shock with zero percent stretch was 2X, the dielectric strength was 10.4 KV and the burn-out OFM was 8.3.

EXAMPLE 2

A reaction vessel equipped as in Example 1 was charged with 122.5 parts trimethylol propane, 273 parts neopentyl glycol, 158 parts methylene dianiline, 306 parts trimellitic acid, 365 parts of 12 percent isophthalic acid and 88 percent terephthalic acid, 25 parts tetraisopropyl titanate (TPT) and 176 parts N-methylpyrrolidone, the materials being heated at a maximum of 220° C. until an acid number of essentially zero was obtained. The reaction mixture was cut slowly with 250 parts of butanol after which there were added 139 parts of dimethylethanolamine and 200 parts of water. There were then finally added 1800 parts of water to provide a clear, water-soluble polyesterimide solution having 37 percent by weight solids which was adjusted to 27 percent solids using water. The enamel having a Gardner-Holt viscosity at 25° C. of Z-4 was applied to 18 AWG copper wire at a speed of 55 ft/min. to a build of about 2.9 to 3.1 mils and cured at from 300° C. to 475° C. The wire when tested had a flexibility at 25 percent starch of 1X, a dissipation factor at 170° C. of 5.9 and a 2000 g cut-through of 243° C.

EXAMPLE 3

A reaction vessel equipped as in Example 1 was charged with 142 parts trimethylol propane, 266 parts neopentyl glycol, 132.5 parts methylene dianiline, 257 parts trimellitic anhydride, 225 parts of acid containing 85 percent isophthalic acid and 15 percent terephthalic acid and 105 parts of adipic acid. The contents were heated at 220° C. with collection of water until an acid number of essentially zero was obtained. The reaction mixture was then cut with 250 parts of butanol following which there were added at a temperature of 120° C., 160 parts of dimethylethanolamine in 200 parts of water.

There were then added an additional 1600 parts of water. The clear solution of polyesterimide so obtained had a solids content of 27.5 percent by weight and a viscosity at 25° C. of 1500 cs. When coated on 18 AWG copper wire to a build of from 2.9 to 3.0 mils at 55 ft/min. and cured at from about 300° C. to 475° C., the flexibility at 25 percent stretch was 1X, there were no continuity breaks for each 100 feet tested, the 170° C. dissipation factor was 6, the 2000 g cut-through was 235° C., the 150° C. heat shock with zero percent stretch was 2X, the dielectric strength was 12.4 KV and the burnout OFM was 10.8.

EXAMPLE 4

A reaction vessel equipped as in Example 1 was charged with 142 parts trimethylol propane, 266 parts neopentyl glycol, 79 parts methylene dianiline, 157 parts trimellitic anhydride, 20 parts tetraisopropyl titanate (TPT), 31 parts ethylene glycol, 94.7 parts adipic acid and 437 parts of a mixture of 85 percent isophthalic acid and 15 percent terephthalic acid, the materials being heated at 220° C. with water collected until an acid number of essentially zero was obtained. Then 306.5 parts of butanol were added slowly, followed by 117.5 parts dimethylethanolamine in 200 parts of water, which latter were added to the hot solution. Then 1858 parts of water were added. The resulting enamel was adjusted to 29.8 percent by weight solids using water, the viscosity at 30° C. being about 4500 centipoises. The enamel was applied to 18 AWG copper wire at a speed of 45 ft/min. to a build of 2.9 to 3.0 mils and cured at from 300° C. to 475° C. The wire, when tested, had a flexibility at 25 percent stretch of 1X, a 170° C. dissipation factor of 3.7, a 2000 g cut-through of 212° C., a 150° C. heat shock with zero percent stretch of 2X, a dielectric strength of 12.4 KV and a burn-out OFM of 5.3.

There are provided by the present invention polyesterimides which can be variously modified with amide, urethane and hydantoin groups, which are characterized by good coating characteristics and particularly by their enhanced ability to be dissolved in water, thus representing a decided improvement over normal organic solvent solutions of such materials. As pointed out above, while such materials are particularly useful as magnet wire enamels and varnishes, they can also be used for preparing laminates of layered materials, composites of fibers, powders, particles and the like and for coating purposes in general.

What we claim as new and desire to secure by Letters Patent of the United States is:

1. A coating composition containing essentially no free carboxyl groups and selected from the group consisting of polyesterimide hydantoins, polyesterimide urethanes and mixtures thereof, at least part of the imide rings being cleaved with a compound selected from the group consisting of an amine, ammonia and ammonium hydroxide, said composition containing water as a solvent.

2. A coating composition as in claim 1 where the amine material is tertiary amine.

3. A coating composition as in claim 2 where the tertiary amine is dimethylethanolamine.

4. A coating composition as in claim 1 where said compound is ammonia.

5. A composition as in claim 1 wherein the polyester moiety of said polyesterimide hydantoins and polyesterimide urethanes is the reaction product of acid material, polyhydric alcohol having at least three hydroxyl groups and diol.

6. The process of preparing a water-soluble polyesterimide ring containing composition which comprises reacting polybasic acid material, polyhydric alcohol having at least three hydroxyl groups, diol, imide group containing moiety and a material selected from the group consisting of hydantoin group containing moiety and isocyanate group containing moiety to form a polyesterimide containing material having an acid number of essentially zero and further reacting said composition with a compound selected from the group consisting of amine, ammonia and ammonium hydroxide to cleave at least part of the imide rings.

* * * * *